US 6,745,570 B2

(12) United States Patent
Renggli et al.

(10) Patent No.: US 6,745,570 B2
(45) Date of Patent: Jun. 8, 2004

(54) METHODS AND APPARATUS FOR SEALING GAS TURBINE ENGINE NOZZLES USING A FLAP SYSTEM

(75) Inventors: Bernard J. Renggli, Cincinnati, OH (US); Darrell Senile, Oxford, OH (US)

(73) Assignee: General Electric Co., Schenectady, NY (US)

( * ) Notice: Subject to any disclaimer, the term of this patent is extended or adjusted under 35 U.S.C. 154(b) by 75 days.

(21) Appl. No.: 10/061,618

(22) Filed: Feb. 1, 2002

(65) Prior Publication Data

US 2003/0145599 A1 Aug. 7, 2003

(51) Int. Cl.$^7$ ................................................ F02K 1/00
(52) U.S. Cl. .......................... 60/771; 60/228; 60/233; 60/269; 239/265.19; 239/391.43; 29/890.01; 29/890.09; 29/904
(58) Field of Search ......................... 60/228, 230, 232, 60/233, 262, 269, 761, 771; 239/265.19, 265.33, 269.37, 391.41; 29/21.1, 24, 890.01, 890.09, 904

(56) References Cited

U.S. PATENT DOCUMENTS

| | | | | |
|---|---|---|---|---|
| 4,292,802 A | | 10/1981 | Snow | |
| 4,637,550 A | * | 1/1987 | Nash | 239/265.37 |
| 5,000,386 A | * | 3/1991 | Lybarger | 239/265.39 |
| 5,039,014 A | * | 8/1991 | Lippmeier | 239/265.39 |
| 5,054,997 A | | 10/1991 | Corsmeier et al. | |
| 5,269,467 A | * | 12/1993 | Williams et al. | 239/265.41 |
| 5,307,624 A | | 5/1994 | Even-Nur et al. | |
| 5,437,411 A | | 8/1995 | Renggli | |
| 5,667,140 A | | 9/1997 | Johnson et al. | |
| 5,683,034 A | | 11/1997 | Johnson et al. | |
| 5,713,522 A | | 2/1998 | Lundberg | |
| 5,797,544 A | * | 8/1998 | Ward | 239/265.37 |

\* cited by examiner

*Primary Examiner*—Justine R. Yu
*Assistant Examiner*—John F. Belena
(74) *Attorney, Agent, or Firm*—Armstrong Teasdale LLP; Robert B. Reeser, III

(57) ABSTRACT

A method for assembling a flap system for a gas turbine engine exhaust nozzle including a plurality of backbone assemblies facilitates extending a useful life of the exhaust nozzle. The method includes providing a flap basesheet having a width defined between a pair of side edges that are coupled together by a leading edge and a trailing edge, and including at least one stiffener that extends between the basesheet side edges and includes an intermediate portion that has a width that is smaller than that of the basesheet and is at least one of bonded to and formed integrally with the basesheet, and coupling the basesheet to the gas turbine engine with a backbone assembly.

18 Claims, 4 Drawing Sheets

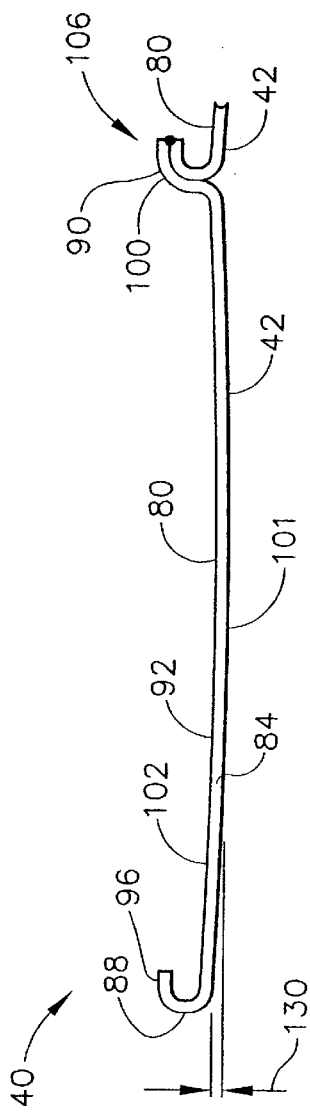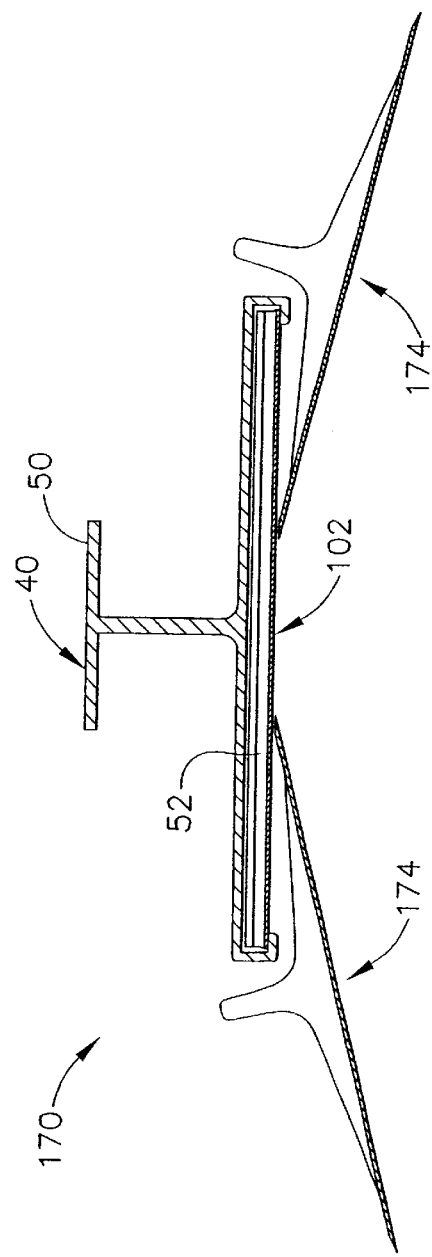

METHODS AND APPARATUS FOR SEALING GAS TURBINE ENGINE NOZZLES USING A FLAP SYSTEM

BACKGROUND OF THE INVENTION

This invention relates generally to gas turbine engine nozzles and more particularly, to methods and apparatus for sealing gas turbine engine nozzles.

At least some known gas turbine engines include an exhaust nozzle including a variable geometry system. The variable geometry system adjusts an area of the exhaust nozzle through the use of flaps and seals. The flaps define discrete sectors of the flowpath, and the seals form the remaining flowpath between adjacent flaps. Because the exhaust nozzles are subjected to high temperatures and thermal gradients as a result of hot combustion gases exiting the engine, the variable geometry system must maintain a coherent flowpath while shielding the structural components of the variable geometry system.

At least some known flap and seal systems consist of a backbone and a basesheet construction. The backbones secure the basesheets within the variable geometry system. The flaps and seals are conventionally arranged such that each seal basesheet extends over a portion of the flap basesheet thus shielding the flap edges from hot combustion gases exiting the engine. Accordingly, a center portion of each flap basesheet is unshielded and exposed to the combustion gases. During engine operation, the flap basesheet edges are exposed to less heat than the center portion of the basesheet, and as a result, a circumferential thermal gradient may be induced to the basesheet. Continued operation with the thermal gradient may induce thermal stresses into the basesheet which over time, may lead to warping, thermally induced distortion, cracking, or premature failure of the flaps.

To facilitate reducing thermal stresses induced to the flaps, at least some known engines include a "floating" basesheet design. More specifically, within such designs, a unitary basesheet is used to establish a portion of the flowpath. Because the basesheet is not rigidly coupled to the backbone, the basesheet may thermally expand more than the backbone, thus facilitating reducing thermal gradients in comparison to designs having basesheets that are attached rigidly to or formed integrally with the backbone. However, because the center portion of the associated flap basesheets are still exposed to the hot combustion gases, thermal gradients between the basesheet edges and basesheet center portion may cause warping, cracking, or thermally induced distortion within the flap assembly.

At least some other known engines include a longitudinally segmented basesheet design which has a central portion connected to the edge portions by channels which are crimped on the basesheet. The channels extend across and are attached to a backside of the basesheet and facilitate reducing thermally induced stresses by permitting differential thermal growth of the predominately cold portion of the seal assembly and the predominately hot portion of the segmented basesheet. However, aligning the basesheets while attaching the channel to the backside of the basesheets may be time consuming. Furthermore, because the channel is attached across the basesheet and between the edges of the basesheet, continued thermal cycling may create local stress concentrations between the channel and the basesheet.

BRIEF SUMMARY OF THE INVENTION

In one aspect, a method for assembling a flap system for a gas turbine engine exhaust nozzle including a plurality of backbone and basesheet assemblies is provided. The method includes providing a flap basesheet having a width defined between a pair of side edges that are coupled together by a leading edge and a trailing edge, and including at least one stiffener that extends between the basesheet side edges and includes an intermediate portion that has a width that is smaller than that of the basesheet and is at least one of bonded to and formed integrally with the basesheet, and coupling the basesheet to the gas turbine engine with a backbone assembly.

In another aspect, a flap basesheet assembly for a gas turbine engine exhaust nozzle is provided. The basesheet assembly includes a body and at least one stiffener. The body includes a first side edge and a second side edge coupled together by a leading edge and a trailing edge. The body has a width extending between the first and second sides. The at least one stiffener extends across the body between the first and second edges and includes an intermediate section that has a width smaller than that of the body width. The intermediate section of the stiffener is at least one of integrally formed with and bonded to the basesheet assembly body.

In a further aspect, a gas turbine engine including a variable engine exhaust nozzle including a flap basesheet system coupled to the engine exhaust nozzle is provided. The basesheet system includes a body and at least one stiffener. The body includes a first side edge and a second side edge that are coupled at a leading edge and a trailing edge. The body has a width defined between the first and second sides. The at least one stiffener extends across the body between the first and second edges. The stiffener includes an intermediate section that has a width that is smaller than the body width. The stiffener intermediate section is at least one of integrally formed with and bonded to the basesheet assembly body.

BRIEF DESCRIPTION OF THE DRAWINGS

FIG. 3 is a cross-sectional view of the flap basesheet system shown in FIG. 2 taken along line 3—3;

FIG. 4 is a cross-sectional schematic view of an exhaust nozzle flap and seal system that may be used with the flap basesheet system shown in FIG. 2;

DETAILED DESCRIPTION OF THE INVENTION

Figure 1:
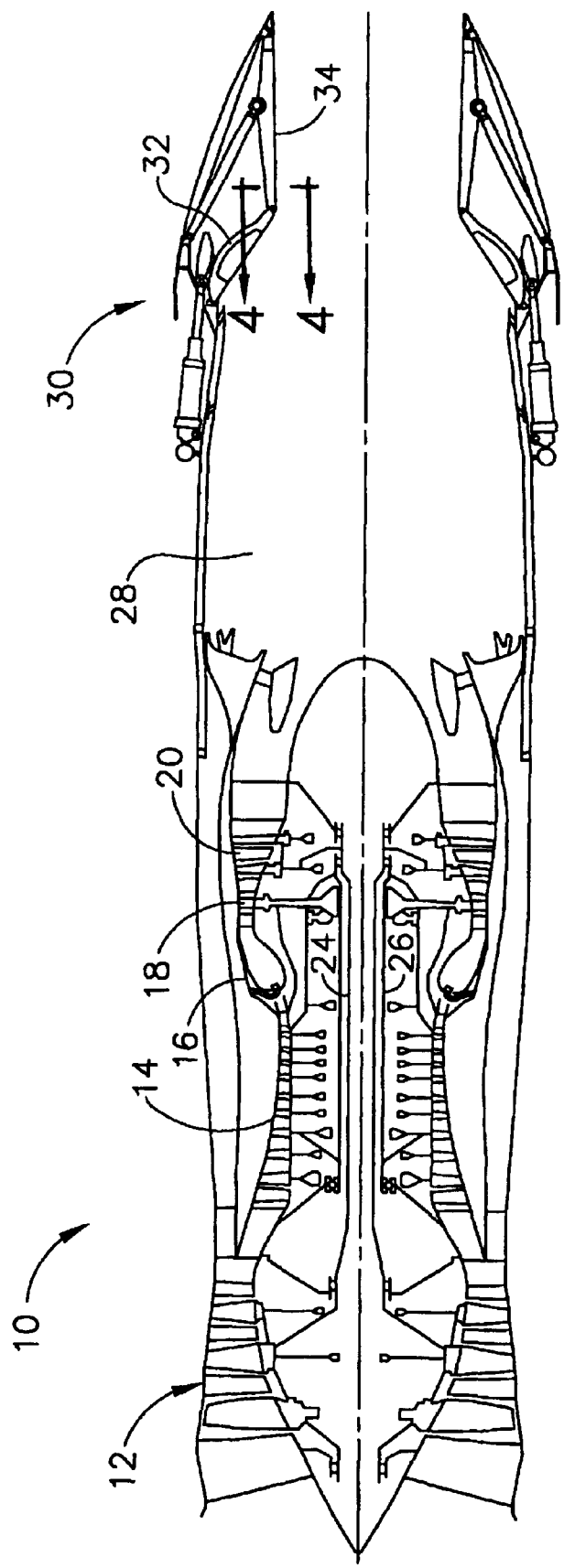
FIG. 1 is a schematic illustration of a gas turbine engine.

FIG. 1 is a schematic illustration of a gas turbine engine 10 including a fan assembly 12, a high pressure compressor 14, and a combustor 16. In one embodiment, engine 10 is a F414 engine available from General Electric Company, Cincinnati, Ohio. Engine 10 also includes a high pressure turbine 18 and a low pressure turbine 20. Fan assembly 12 and turbine 20 are coupled by a first shaft 24, and compressor 14 and turbine 18 are coupled by a second shaft 26.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust nozzle 28. Exhaust nozzle 28 includes a variable geometry system 30 consisting of convergent flaps 32 and seals (not shown in FIG. 1), and divergent flaps 34 and seals (not shown in FIG. 1).

Figure 2:
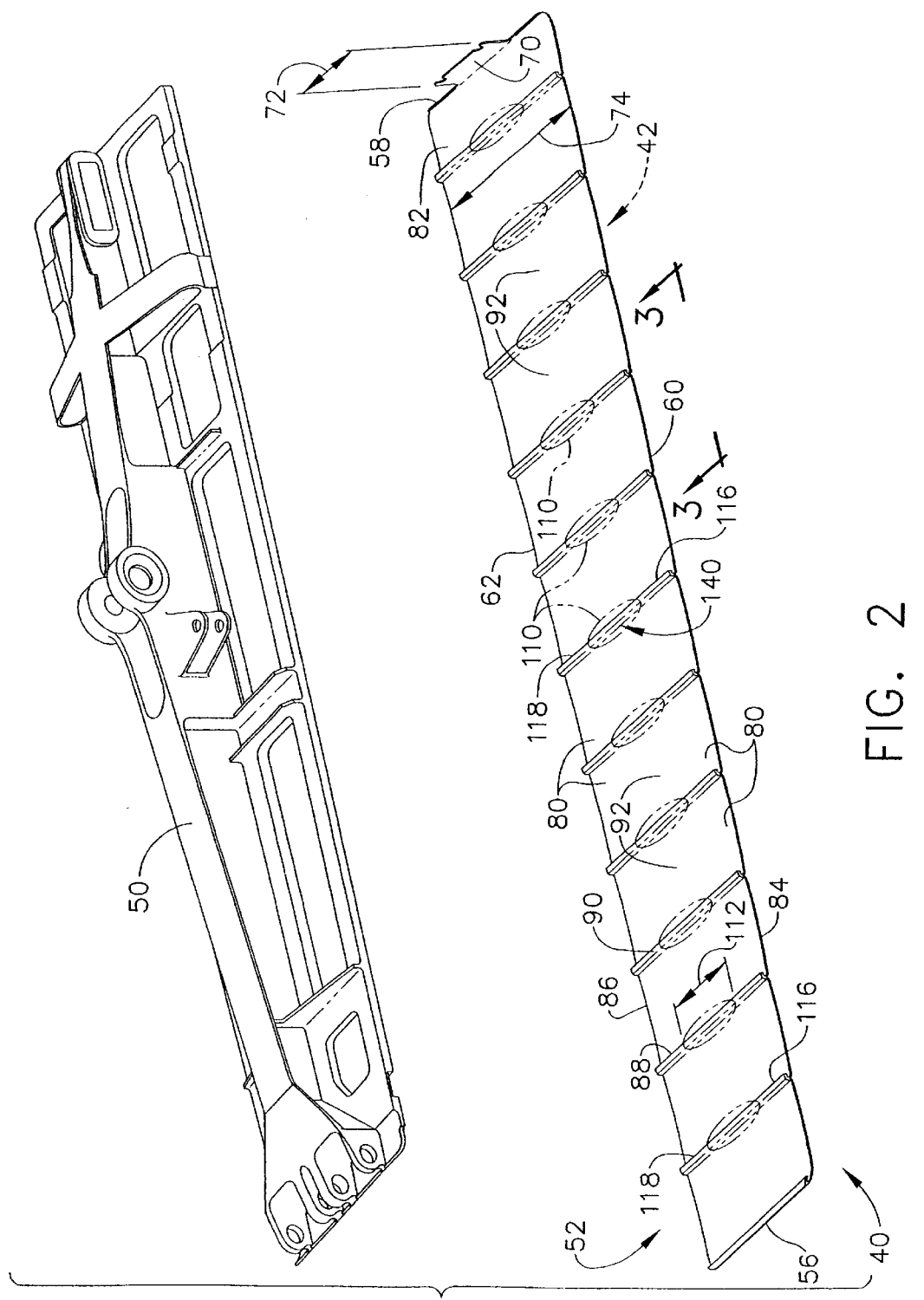
FIG. 2 is a perspective view of a flap system that may be used with the engine shown in FIG. 1.

FIG. 2 is a perspective view of a flap system 40 that may be used with a gas turbine engine, such as gas turbine engine 10 (shown in FIG. 1). FIG. 3 is a cross-sectional view of flap system 40 shown in FIG. 2 and taken along line 3—3. In the exemplary embodiment, flap system 40 is utilized with an engine exhaust nozzle, such as nozzle 28 (shown in FIG. 1), that is a variable area exhaust nozzle that utilizes flap and seal variable geometry. Flap system 40 is coupled to the exhaust nozzle to facilitate shielding variable geometry system components from high temperature combustion gases exiting the engine. More specifically, flap system 40 is coupled to the exhaust nozzle such that a flowpath side 42 of flap system 40 is exposed to combustion gases exiting engine. Accordingly, seal system flowpath side 42 defines a portion of the flowpath through the nozzle.

Flap system 40 includes a plurality of backbones 50 and basesheet assemblies 52 extending circumferentially within an engine exhaust nozzles. Basesheet 50 is exemplary and is known in the art for use within variable area exhaust nozzles. Basesheet assembly 52 is coupled within the engine exhaust nozzle by backbone 50, and has a leading edge 56 and a trailing edge 58. Basesheet assembly leading and trailing edges 56 and 58, respectively, are coupled together by a pair of side edges 60 and 62. In the exemplary embodiment, side edges 60 and 62 are substantially parallel, and leading and trailing edges 56 and 58, respectively, are substantially parallel, and substantially perpendicular with respect to side edges 60 and 62. In an alternative embodiment, flap system 40 includes basesheet assemblies 52 and side edges 60 and 62 are non-parallel.

In the exemplary embodiment, body trailing edge 58 includes an aft retainer 70. Basesheet trailing edge 58 is coupled to backbone 50 by retainer 70. In the exemplary embodiment, retainer 70 is formed integrally with basesheet 52. Retainer 70 has a width 72 that is less than a width 74 of basesheet 52. Basesheet width 74 is defined between side edges 60 and 62.

Basesheet assembly 52 includes a plurality of vane segments 80 coupled together. In the exemplary embodiment, vane segments 80 are identical, with the exception being that a vane segment 82 forming basesheet trailing edge 58 includes retainer 70. In one embodiment, vane segments 80 are fabricated from a metallic material. In another embodiment, vane segments 80 are fabricated from a silicon-carbon graphite material. Vane segments 80 are coupled together, as described below, and extend between basesheet assembly leading and trailing edges 56 and 58, respectively, and between basesheet assembly side edges 60 and 62.

Each vane segment 80 has a panel body 92 defined between a pair of side edges 84 and 86 that are connected together by a leading edge 88 and a trailing edge 90. In the exemplary embodiment, side edges 84 and 86 are substantially parallel, and edges 88 and 90 are also substantially parallel. Furthermore, in the exemplary embodiment, edges 88 and 90 are substantially perpendicular to side edges 84 and 86.

A rib 96 is formed integrally with vane segment leading edge 88. More specifically, rib 96 extends across panel body 92 between body side edges 84 and 86. In the exemplary embodiment, rib 96 forms a substantially semi-circular cross-sectional profile. Rib 96 facilitates increasing a structural integrity of each respective vane segment 80.

A channel 100 is formed integrally with vane segment trailing edge 90. Channel 100 extends across panel body 92 between body side edges 84 and 86. Channel 100 is arcuate such that channel 100 has a curved cross-sectional profile that enables channel 100 to conform to a rib 96. More specifically, each vane segment panel body 92 has a flowpath side 101 that is adjacent the nozzle exhaust flowpath, and a back side 102 that is between flowpath side 101 and backbone 50. Channel 100 is contoured to mate against an adjacent rib 96 to form a stiffener assembly 106 that extends across panel body 92. Stiffener assembly 106 facilitates preventing basesheet assembly 52 from warping.

Adjacent vane segments 80 are securely coupled together to form basesheet assembly 52, and to form stiffener assemblies 106. Specifically, adjacent vane segments 80 are coupled at stiffener assemblies 106. In the exemplary embodiment, adjacent vane segments 80 are welded together at stiffener assemblies 106. In another embodiment, adjacent vane segments 80 are brazed together at stiffener assemblies 106. More specifically, adjacent vane segments 80 are only brazed together at an intermediate section 110 of each formed stiffener assembly 106. Accordingly, when base vane segments 80 are coupled together at intermediate sections 110 to form basesheet assembly 52, basesheet assembly 52 is contiguous through intermediate sections 110.

Each stiffener assembly intermediate section 110 has a width 112 that is smaller than basesheet assembly width 74. In the exemplary embodiment, stiffener intermediate section width 112 is approximately equal one third of basesheet assembly width 74. Only stiffener assembly intermediate section 110 is securely coupled together, and as such, each stiffener assembly 106 also includes a pair of expansion sections 116 and 118. More specifically, section 116 extends between basesheet side edge 60 and stiffener intermediate section 110, and stiffener expansion section 118 extends between basesheet side edge 62 and stiffener intermediate section 110.

Each vane segment panel body 92 extends between vane segment leading and trailing edges 88 and 90. More specifically, panel body 92 is bowed between leading and trailing edges 88 and 90, such that at leading edge 88, panel body 92 is displaced a distance 130 from planar. In one embodiment, distance 130 is approximately equal 0.02 inches.

During assembly of flap system 40, initially basesheet assembly 52 is assembled and then coupled to backbone 50. More specifically, as basesheet assembly 52 is assembled, adjacent vane segments 80 are positioned such that a leading vane segment trailing edge channel 100 is mated against a trailing vane segment leading edge rib 96 to form stiffener assembly 106. Stiffener assembly intermediate section 110 is then securely coupled together using for example, welding or brazing, such that stiffener assembly expansion sections 116 and 118 remain in contact, but unsecured together.

Basesheet assembly 52 is then coupled to backbone 50 and positioned such that flap system 40 extends in an overlapping fashion between a pair of adjacent exhaust nozzle variable geometry seals (not shown in FIGS. 2 and 3). More specifically, when secured within an engine, each basesheet assembly 52 forms a portion of the exhaust flowpath through the engine, such that adjacent basesheet assembly edges 60 and 62, facilitate shielding exhaust nozzle flap backbone 50 from hot combustion gases exiting the engine. Accordingly, a center portion 140 of each basesheet assembly 52 is exposed directly to hot combustion gases exiting the exhaust nozzle. Basesheet assembly center portion 140 extends axially between basesheet assembly leading and trailing edges 56 and 58, respectively, along the contiguous portion formed by stiffener intermediate portions 106. Additionally, the areas of basesheet assembly 52 adjacent to exposed center portion 140 and bounded by either edge 60 or 62 are substantially shielded from the hot combustion gases.

During operation, basesheet assembly center portion 140 is exposed directly to hot combustion gases exiting the engine and as a result, basesheet assembly center portion 140 may thermally expand more than portions of basesheet assembly 52 adjacent basesheet assembly edges 60 and 62 which are exposed to lower temperatures. As center portion 140 thermally expands, stiffener assembly expansion sections 116 and 118 may separate, thus, facilitating reducing thermally induced strains and stresses into basesheet assembly 52 and flap system 40.

Furthermore, the bow of panel body 92 facilitates panel body 92 deflecting flat against the exhaust nozzle seal edges during operation. More specifically, during operation, nozzle pressures force panel body 92 to deflect to facilitate reducing contact stresses and ultimately minimizing contact wear between basesheet assembly 52 and the exhaust nozzle seals (not shown in FIG. 3).

FIG. 4 is a cross-sectional schematic view of an exhaust nozzle flap and seal system 170 that may be used with flap system 40 and engine 10 (shown in FIG. 1). Flap and seal system 170 extends substantially circumferentially within an exhaust nozzle, such as exhaust nozzle 28 (show in FIG. 1) and includes conventional seal assemblies 174.

Basesheet assembly 52 is coupled to backbone 50 and positioned such that flap system 40 extends in an overlapping fashion between a pair of adjacent exhaust nozzle variable geometry seal assemblies 174. More specifically, when secured within an engine, each basesheet assembly 52 forms a portion of the exhaust flowpath through the engine, and such that adjacent basesheet assembly edges 60 and 62 facilitate shielding exhaust nozzle flap backbone 50 from hot combustion gases exiting the engine. Accordingly, a center portion 140 of each basesheet assembly 52 is exposed directly to hot combustion gases exiting the exhaust nozzle. Basesheet assembly center portion 140 extends axially between basesheet assembly leading and trailing edges 56 and 58, respectively, along the contiguous portion formed by stiffener intermediate portions 106. Additionally, the areas of basesheet assembly 52 adjacent to exposed center portion 140 and bounded by either edge 60 or 62 are substantially shielded from the hot combustion gases.

During operation, nozzle flap and seal system 170 is repositioned such that a distance 180 between adjacent exhaust nozzle variable geometry seal assemblies 174 may be increased or decreased. Accordingly, a size of basesheet center portion 140 exposed to the hot combustion gases may be increased or decreased.

Figure 5:
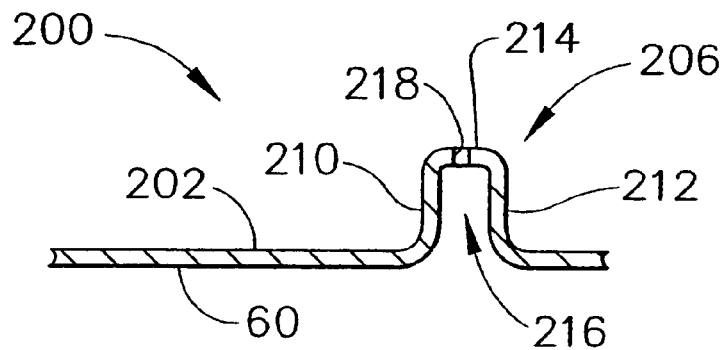
FIG. 5 is a cross-sectional view of an alternative embodiment of a flap system basesheet during an initial stage of fabrication.
Figure 6:
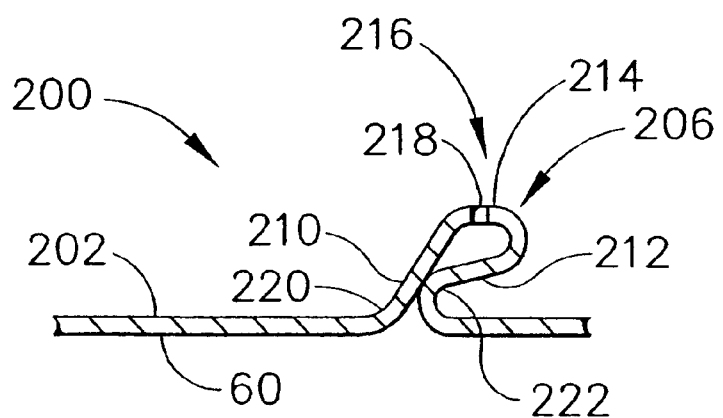
FIG. 6 is a cross-sectional view of the flap system basesheet shown in FIG. 4 and during a final stage of fabrication.

FIG. 5 is a cross-sectional view of an alternative embodiment of a seal system basesheet assembly 200 during an initial stage of fabrication. FIG. 6 is a cross-sectional view of seal system basesheet assembly 200 during a final stage of fabrication. Basesheet assembly 200 is substantially similar to basesheet assembly 52 (shown in FIGS. 2 and 3) and components in basesheet assembly 200 that are identical to components of basesheet assembly 52 are identified in FIGS. 5 and 6 using the same reference numerals used in FIGS. 2 and 3. Accordingly, basesheet assembly 200 may be utilized with flap system 40 (shown in FIGS. 2 and 3) and backbone 50 (shown in FIG. 2), and includes leading edge 56, (shown in FIG. 2), trailing edge 58 (shown in FIG. 2), and side edges 60 and 62 (shown in FIG. 2).

Basesheet assembly 200 does not include a plurality of vane segments 80 (shown in FIGS. 2 and 3), but rather, assembly 200 is fabricated from a unitary body 202. In the exemplary embodiment, body 202 is fabricated from a single piece of metallic material. Initially, stiffener assemblies 206 are formed within body 202 using a known manufacturing process, such as, but not limited to a rolling operation, a bending operation, a press operation, a casting operation, or a drawing operation. More specifically, as shown in FIG. 5, initially each stiffener assembly 206 has a substantially U-shaped cross-sectional profile including a leading edge side 210, a trailing edge side 212, and a trough 214 extending therebetween.

Expansion sections 216 which are similar to expansion sections 116 and 118 (shown in FIG. 2) are then formed. Specifically, slots 218 are extended from each respective basesheet side edge 60 and 62 through each stiffener assembly trough 214 to basesheet center portion 110 (shown in FIG. 2). In one embodiment, slots 218 are fabricated with saw cuts. More specifically, because slots 218 do not extend across basesheet assembly 200, slots 218 also define an intermediate section (not shown) for each stiffener assembly 206.

After expansion sections 216 have been formed, stiffener assembly sides 210 and 212 are distorted to complete the final stage of fabrication of basesheet assembly 200. More specifically, stiffener assembly sides 210 and 212 are forcibly squeezed together near a base 220 and 222 of each respective stiffener assembly side 210 and 212 such that the U-shaped cross-sectional profile of stiffener assembly 200 is changed, and such that stiffener assembly side 212 contacts stiffener assembly side 210 adjacent base 220.

The above-described flap system is cost-effective and highly reliable. The flap system includes a basesheet assembly including a plurality of stiffener assemblies that extend across the basesheet assembly. Each stiffener assembly includes an intermediate section that has a width that is less than the basesheet assembly, and a pair of expansion sections that extend between the intermediate section and each respective basesheet assembly side. The basesheet is only contiguous through the stiffener assembly intermediate sections, and as such, during operation, the expansion sections may separate to facilitate reducing thermal stresses induced to the basesheet assembly. As a result, the basesheet assembly facilitates extending a useful life of the gas turbine engine variable geometry flap system in a cost-effective and reliable manner.

While the invention has been described in terms of various specific embodiments, those skilled in the art will recognize that the invention can be practiced with modification within the spirit and scope of the claims.

What is claimed is:

1. A method for assembling a flap system for a gas turbine engine exhaust nozzle including a plurality of backbone assemblies, said method comprising: providing a flap basesheet having a width defined between a pair of side edges that are coupled together by a leading edge and a trailing edge, and including at least one stiffener that extends between the basesheet side edges and includes an intermediate portion that has a width that is smaller than that of the basesheet and is at least one of bonded to and formed integrally with the basesheet; and forming a first slot in the stiffener that extends from the basesheet first side edge through the stiffener to the stiffener intermediate portion; and forming a second slot in the stiffener that extends from the basesheet second side edge through the stiffener to the stiffener intermediate portion; and coupling the basesheet to the gas turbine engine with a backbone assembly.

2. A method in accordance with claim 1 wherein providing a flap basesheet further comprises providing a flap basesheet formed from a plurality of vane segments that each include a rib, a channel, and a panel extending therebetween, and wherein the vane segments are coupled together to such that a vane segment rib and an adjacent vane segment channel form a stiffener.

3. A method in accordance with claim 2 wherein providing a flap basesheet formed from a plurality of vane segments further comprises providing a flap basesheet formed from a plurality of vane segments that each include a panel that is bowed between each respective vane segment rib and channel.

4. A method in accordance with claim 1 wherein providing a flap basesheet further comprises providing a flap basesheet including at least one stiffener configured to facilitate reducing thermal stresses induced within the flap system.

5. A flap basesheet assembly for a gas turbine engine exhaust nozzle, said flap basesheet assembly comprising: a body comprising a first side edge and a second side edge coupled together by a leading edge and a trailing edge, said body having a width extending between said first and second sides; and at least one stiffener extending across said body between said first and second edges, said stiffener comprising an intermediate section having a width smaller than said body width, said stiffener comprises at least one slot extending through said stiffener from at least one of said body first side edge and said body second side edge to said stiffener intermediate section; and said intermediate section at least one of integrally formed with and bonded to said basesheet assembly body.

6. A flap basesheet assembly in accordance with claim 5 wherein said at least one stiffener comprises a first slot and a second slot extending through said stiffener, said first slot extending from said body first side edge to said stiffener intermediate section, said second slot extending from said body second side edge to said stiffener intermediate section.

7. A flap basesheet assembly in accordance with claim 5 wherein said body further comprises a plurality of vane segments extending between said body leading and trailing edges.

8. A flap basesheet assembly in accordance with claim 7 wherein each said body vane segment includes a channel, a rib, and a panel extending therebetween, each said channel configured to mate with an adjacent vane segment rib to form each said stiffener.

9. A flap basesheet assembly in accordance with claim 8 wherein each said vane segment panel is bowed between each respective vane segment rib and vane segment channel.

10. A flap basesheet assembly in accordance with claim 5 wherein each said stiffener further comprises a first expansion section and a second expansion section, said first expansion section extending between said body first edge and said stiffener intermediate section, said second expansion section extending between said body second edge and said stiffener intermediate section, adjacent first expansion sections unbonded together, adjacent second expansion sections unbonded together.

11. A flap basesheet assembly in accordance with claim 10 wherein said stiffener expansion sections configured to facilitate reducing thermal stresses induced within said flap basesheet assembly.

12. A flap basesheet assembly in accordance with claim 5 wherein said at least one stiffener is configured to facilitate reducing stresses thermally induced to said flap basesheet assembly.

13. A gas turbine engine comprising a variable engine area exhaust nozzle comprising a flap basesheet system coupled to said engine exhaust nozzle, said flap basesheet system comprising a body and at least one stiffener, said body comprising a first side edge and a second side edge coupled at a leading edge and a trailing edge, and having a width extending between said first and second sides, said at least one stiffener extending across said body between said first and second edges, said stiffener comprising an intermediate section having a width smaller than said body width, said stiffener comprising at least one slot extending through said stiffener from at least one of said body first edge and said intermediate section is at least one of integrally formed with and bonded to said flap basesheet assembly body.

14. A gas turbine engine in accordance with claim 13 wherein said at least one stiffener configured to facilitate reducing stresses thermally induced to said flap basesheet system.

15. A gas turbine engine in accordance with claim 13 wherein said flap basesheet system at least one stiffener comprises a plurality of stiffeners.

16. A gas turbine engine in accordance with claim 13 wherein said flap basesheet system at least one stiffener comprises a plurality of stiffeners, each said stiffener comprising a first expansion slot extending between said stiffener intermediate section and said body first edge, and a second expansion slot extending between said stiffener intermediate section and said body second edge.

17. A gas turbine engine in accordance with claim 13 wherein said flap basesheet system body further comprises a plurality of vane segments extending between said body leading and trailing edges, each said vane segment comprising a channel, a rib, and a panel extending therebetween.

18. A gas turbine engine in accordance with claim 17 wherein each said flap basesheet system body vane segment panel is bowed between each respective said vane segment rib and channel.

* * * * *

UNITED STATES PATENT AND TRADEMARK OFFICE
CERTIFICATE OF CORRECTION

PATENT NO. : 6,745,570 B2
DATED : June 8, 2004
INVENTOR(S) : Renggli et al.

It is certified that error appears in the above-identified patent and that said Letters Patent is hereby corrected as shown below:

Column 8,
Line 30, after "first edge and said" insert -- body second edge to said stiffener intermediate section; and --.

Signed and Sealed this

Sixth Day of September, 2005

JON W. DUDAS
*Director of the United States Patent and Trademark Office*